(12) United States Patent
Kimura

(10) Patent No.: US 10,185,201 B2
(45) Date of Patent: Jan. 22, 2019

(54) DISPLAY DEVICE

(71) Applicant: Semiconductor Energy Laboratory Co., Ltd., Kanagawa-ken (JP)

(72) Inventor: Hajime Kimura, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 15/855,167

(22) Filed: Dec. 27, 2017

(65) Prior Publication Data

US 2018/0120664 A1  May 3, 2018

Related U.S. Application Data

(63) Continuation of application No. 15/341,874, filed on Nov. 2, 2016, now Pat. No. 9,857,658, which is a (Continued)

(30) Foreign Application Priority Data

Jun. 25, 2010 (JP) .................................. 2010-144911

(51) Int. Cl.
*G02B 26/00* (2006.01)
*G02F 1/167* (2006.01)
*G09G 3/34* (2006.01)

(52) U.S. Cl.
CPC ............... *G02F 1/167* (2013.01); *G09G 3/34* (2013.01); *G09G 3/3446* (2013.01); (Continued)

(58) Field of Classification Search
CPC ....................................................... G02F 1/167
(Continued)

(56) References Cited

U.S. PATENT DOCUMENTS 6,630,977 B1  10/2003 Yamazaki et al.
6,661,488 B1  12/2003 Takeda et al.
(Continued)

FOREIGN PATENT DOCUMENTS

CN  101762923 A  6/2010
EP  1 429 177 A1  6/2004
(Continued)

OTHER PUBLICATIONS

Taiwanese Office Action re Application No. TW 100121639, dated May 26, 2015.
(Continued)

*Primary Examiner* — James Jones
(74) *Attorney, Agent, or Firm* — Husch Blackwell LLP

(57) ABSTRACT

In a device for displaying images by application of an electric field to a charged substance, a structure for reducing afterimages and a method for manufacturing the structure are provided. The device is a display device which includes a plurality of pixel electrodes and a charged layer (a layer including a charged substance) provided over the pixel electrodes. An end of one of two pixel electrodes that are adjacent to each other among the plurality of pixel electrodes has a depression in an end-face direction, and an end of the other of the pixel electrodes has a projection in the end-face direction. In a state in which the depression and the projection are in a set, a gap is formed between the two pixel electrodes.

28 Claims, 13 Drawing Sheets

Related U.S. Application Data continuation of application No. 15/046,207, filed on Feb. 17, 2016, now Pat. No. 9,488,895, which is a continuation of application No. 14/618,418, filed on Feb. 10, 2015, now Pat. No. 9,268,193, which is a continuation of application No. 14/335,306, filed on Jul. 18, 2014, now Pat. No. 8,958,140, which is a continuation of application No. 13/168,025, filed on Jun. 24, 2011, now Pat. No. 8,786,934.

(52) U.S. Cl.
CPC ............... *G02F 2001/1676* (2013.01); *G02F 2201/123* (2013.01); *G09G 2310/0272* (2013.01)

(58) Field of Classification Search
USPC ........................................ 359/296
See application file for complete search history.

(56) References Cited

U.S. PATENT DOCUMENTS

| | | |
|---|---|---|
| 6,771,345 B2 | 8/2004 | Liu et al. |
| 6,885,146 B2 | 4/2005 | Yamazaki et al. |
| 6,909,532 B2 | 6/2005 | Chung et al. |
| 7,110,077 B2 | 9/2006 | Liu et al. |
| 7,116,318 B2 | 10/2006 | Amundson et al. |
| 7,139,043 B2 | 11/2006 | Kwon et al. |
| 7,177,067 B1 | 2/2007 | Sakamoto |
| 7,190,008 B2 | 3/2007 | Amundson et al. |
| 7,440,062 B2 | 10/2008 | Liu et al. |
| 7,542,024 B2 | 6/2009 | Koyama |
| 7,573,551 B2 | 8/2009 | Koma et al. |
| 7,576,829 B2 | 8/2009 | Kikuchi et al. |
| 7,598,173 B2 | 10/2009 | Ritenour et al. |
| 7,605,799 B2 | 10/2009 | Amundson et al. |
| 7,724,338 B2 | 5/2010 | Kwon et al. |
| 7,729,040 B2 | 6/2010 | Uchida |
| 7,746,437 B2 | 6/2010 | Kizu et al. |
| 7,847,904 B2 | 12/2010 | Kimura |
| 7,847,906 B2 | 12/2010 | Tak |
| 7,869,119 B2 | 1/2011 | Oikawa et al. |
| 7,872,261 B2 | 1/2011 | Ikeda |
| 7,876,407 B2 | 1/2011 | Koma et al. |
| 7,897,067 B2 | 3/2011 | Inoue |
| 7,961,264 B2 | 6/2011 | Liu et al. |
| 7,968,388 B2 | 6/2011 | Komatsu |
| 8,089,596 B2 | 1/2012 | Koma et al. |
| 8,144,389 B2 | 3/2012 | Oikawa et al. |
| 8,223,287 B2 | 7/2012 | Ono et al. |
| 8,253,872 B2 | 8/2012 | Ina et al. |
| 8,345,198 B2 | 1/2013 | Koma et al. |
| 8,373,211 B2 | 2/2013 | Amundson et al. |
| 8,537,316 B2 | 9/2013 | Koma et al. |
| 8,681,090 B2 | 3/2014 | Miyashita |
| 8,786,934 B2 * | 7/2014 | Kimura .................. G02F 1/167 359/296 |
| 8,969,886 B2 | 3/2015 | Amundson |
| 9,268,193 B2 * | 2/2016 | Kimura .................. G02F 1/167 |
| 9,419,024 B2 | 8/2016 | Ritenour et al. |
| 9,488,895 B2 * | 11/2016 | Kimura .................. G02F 1/167 |
| 9,632,389 B2 | 4/2017 | Ritenour et al. |
| 9,857,658 B2 * | 1/2018 | Kimura .................. G02F 1/167 |
| 2003/0090612 A1 | 5/2003 | Nakayoshi et al. |
| 2003/0206331 A1 | 11/2003 | Chung et al. |
| 2004/0169777 A1 | 9/2004 | Tanaka et al. |
| 2006/0290867 A1 | 12/2006 | Ahn et al. |
| 2007/0002242 A1 | 1/2007 | Ogata |
| 2007/0002249 A1 | 1/2007 | Yoo et al. |
| 2007/0126968 A1 | 6/2007 | Uochi |
| 2008/0079892 A1 | 4/2008 | Fujikawa et al. |
| 2008/0268738 A1 | 10/2008 | Kanai et al. |
| 2008/0273132 A1 | 11/2008 | Hsu et al. |
| 2008/0284970 A1 | 11/2008 | Ishitani |
| 2009/0207475 A1 * | 8/2009 | Jung ........................ G02F 1/167 359/296 |
| 2009/0212291 A1 | 8/2009 | Ikeda |
| 2009/0268274 A1 | 10/2009 | Masuzawa et al. |
| 2009/0315044 A1 | 12/2009 | Amundson et al. |
| 2010/0007942 A1 | 1/2010 | Oikawa et al. |
| 2010/0155735 A1 | 6/2010 | Park |
| 2010/0277443 A1 | 11/2010 | Yamazaki et al. |
| 2011/0006302 A1 | 1/2011 | Yamazaki et al. |
| 2011/0012116 A1 | 1/2011 | Yamazaki et al. |
| 2011/0018915 A1 | 1/2011 | Umezaki et al. |
| 2011/0057870 A1 * | 3/2011 | Miyashita .............. G02F 1/167 345/107 |
| 2011/0063340 A1 | 3/2011 | Umezaki et al. |
| 2012/0001889 A1 | 1/2012 | Kimura |

FOREIGN PATENT DOCUMENTS

| | | |
|---|---|---|
| EP | 1 743 931 A1 | 1/2007 |
| JP | 10-301150 A | 11/1998 |
| JP | 11-174453 A | 7/1999 |
| JP | 11-174481 A | 7/1999 |
| JP | 2001-222026 A | 8/2001 |
| JP | 3096202 B | 9/2003 |
| JP | 2005-524110 | 8/2005 |
| JP | 2006-243364 A | 9/2006 |
| JP | 2006-259383 A | 9/2006 |
| JP | 2007-133013 A | 5/2007 |
| JP | 2008-058690 A | 3/2008 |
| JP | 2008-096616 A | 4/2008 |
| JP | 2008-102392 A | 5/2008 |
| JP | 2008-159934 A | 7/2008 |
| JP | 2008-276153 A | 11/2008 |
| JP | 2009-076852 A | 4/2009 |
| JP | 2009-222902 A | 10/2009 |
| JP | 2010-039479 A | 2/2010 |
| JP | 2010-098280 A | 4/2010 |
| JP | 2010-152322 A | 7/2010 |
| KR | 2008-0051273 A | 6/2008 |
| KR | 2009-0023265 A | 3/2009 |
| KR | 2010-0007773 A | 1/2010 |
| KR | 2010-0073780 A | 7/2010 |
| TW | 583425 | 4/2004 |
| TW | 200405953 | 4/2004 |
| TW | 200518348 | 6/2005 |
| TW | 200519500 | 6/2005 |
| TW | 200536125 | 11/2005 |
| TW | 200700868 | 1/2007 |
| TW | 200715018 | 4/2007 |
| TW | 200848890 | 12/2008 |
| TW | 200944884 | 11/2009 |
| TW | 201023021 | 6/2010 |
| TW | 201120555 | 6/2011 |
| TW | 201219950 | 5/2012 |
| WO | WO 2003/091798 A1 | 11/2003 |
| WO | WO 2003/092077 A2 | 11/2003 |
| WO | WO 2005/045509 A2 | 5/2005 |
| WO | WO 2005/090520 A1 | 9/2005 |
| WO | WO 2008/099947 A1 | 8/2008 |

OTHER PUBLICATIONS

Taiwanese Office Action re Application No. TW 104134020, dated Jun. 4, 2016.

Taiwanese Office Action re Application No. TW 106118888, dated Oct. 17, 2017.

* cited by examiner

DISPLAY DEVICE

This application is a continuation of copending U.S. application Ser. No. 15/341,874, filed on Nov. 2, 2016 which is a continuation of U.S. application Ser. No. 15/046,207, filed on Feb. 17, 2016 (now U.S. Pat. No. 9,488,895 issued Nov. 8, 2015) which is a continuation of U.S. application Ser. No. 14/618,418, filed on Feb. 10, 2015 (now U.S. Pat. No. 9,268,193 issued Feb. 23, 2016) which is a continuation of U.S. application Ser. No. 14/335,306, filed on Jul. 18, 2014 (now U.S. Pat. No. 8,958,140 issued Feb. 17, 2015) which is a continuation of U.S. application Ser. No. 13/168,025, filed on Jun. 24, 2011 (now U.S. Pat. No. 8,786,934 issued Jul. 22, 2014), which are all incorporated herein by reference.

BACKGROUND OF THE INVENTION

1. Field of the Invention

The technical field of the present invention relates to a display device and a method for driving a display device. Further, the technical field of the present invention relates to a method for manufacturing a display device.

2. Description of the Related Art

These days, with the development of digitization techniques, text data and image data of newspapers, magazines, and the like can be provided as electronic data. This kind of electronic data is generally displayed on a display device included in a television, a personal computer, a portable electronic terminal, or the like, so that the content of the data can be read.

As display devices with high visibility equivalent to the visibility of paper, display devices using electronic ink such as electrophoretic elements have been developed. As a display device using electronic ink, for example, there is a display device which includes a microcapsule between a pixel electrode and a counter electrode. In such a display device, images are displayed by application of voltage between the two electrodes and movement of colored particles in the microcapsule in an electric field direction (see Reference 1).

REFERENCE

Reference 1: Japanese Published Patent Application No. 2008-276153

SUMMARY OF THE INVENTION

In Reference 1, there has been a problem in that afterimages are generated when display images are switched. One of the causes of the problem is that an end 5003 of a pixel electrode 5001 is linear as illustrated in FIG. 13A. When the end 5003 is linear, an electric field might be inadequately applied to a gap 5005 between the pixel electrodes at the time of image display as illustrated in FIG. 13B; thus, afterimages are generated. Note that in the case where initialization treatment is performed in order to reduce afterimages, image display is slowed down.

In view of the problem, it is an object to improve the performance of a display device, for example, to reduce afterimages.

A display device disclosed in this specification is a device for displaying images by application of an electric field to a charged substance. When the display device includes a plurality of pixel electrodes and some or all of the ends of two pixel electrodes that are adjacent to each other are nonlinear, an electric field is adequately applied to the charged substance in a gap between the pixel electrodes.

One embodiment of the present invention is a display device which includes a plurality of pixel electrodes and a charged layer (also referred to as a layer including a charged substance) provided over the pixel electrodes. Ends of two pixel electrodes that are adjacent to each other among the plurality of pixel electrodes include curved portions in an end-face direction. In this specification, the end-face direction is a direction that is parallel to an upper surface of the pixel electrode. In addition, the curved portion may have a shape with a vertex (also referred to as an angular shape) or a shape without a vertex (also referred to as a bent shape). Further, the curved portions of the two pixels electrodes are preferably engaged with each other.

Another embodiment of the present invention is a display device which includes a plurality of pixel electrodes and a charged layer provided over the pixel electrodes. Between two pixel electrodes that are adjacent to each other among the plurality of pixel electrodes, an end of one of the pixel electrodes has a depression (or a depression and a projection) in an end-face direction, and an end of the other of the pixel electrodes has a projection (or a depression and a projection) in the end-face direction. In a state in which the depression (or the depression and the projection) of the one of the pixel electrodes and the projection (or the depression and the projection) of the other of the pixel electrodes are in a set, a gap is formed between the two pixel electrodes. In this specification, the description "a depression and a projection (or depressions and projections) are in a set" means a state in which the projection fits in the depression. Further, this state may be expressed by description "a depression and a projection are engaged with each other".

Another embodiment of the present invention is a display device which includes a plurality of pixel electrodes and a charged layer provided over the pixel electrodes. A gap is formed between two pixel electrodes that are adjacent to each other among the plurality of pixel electrodes. The gap has three or more portions whose distances are equal to each other. In the three or more portions, when the middle points of the distances are connected with segments, one or more vertexes are obtained.

Another embodiment of the present invention is a display device which includes a plurality of pixel electrodes and a charged layer provided over the pixel electrodes. Between two pixel electrodes that are adjacent to each other among the plurality of pixel electrodes, ends of the two pixel electrodes are curved and a gap is formed. The gap has three or more portions whose distances are equal to each other.

Another embodiment of the present invention is a display device which includes a plurality of pixel electrodes and a charged layer provided over the pixel electrodes. A right end of one of the plurality of pixel electrodes and a left end of a pixel electrode that is adjacent to the right side of the one pixel electrode are curved and a gap is formed. An upper end of the one pixel electrode and a lower end of a pixel electrode that is adjacent to the upper side of the one pixel electrode are curved and a gap is formed. The gap in the right side of the one pixel electrode and the gap in the upper side of the one pixel electrode have two or more portions whose distances are equal to each other.

Thus, it is possible to improve the performance of a display device, for example, to reduce afterimages.

DETAILED DESCRIPTION OF THE INVENTION

Figure 1:
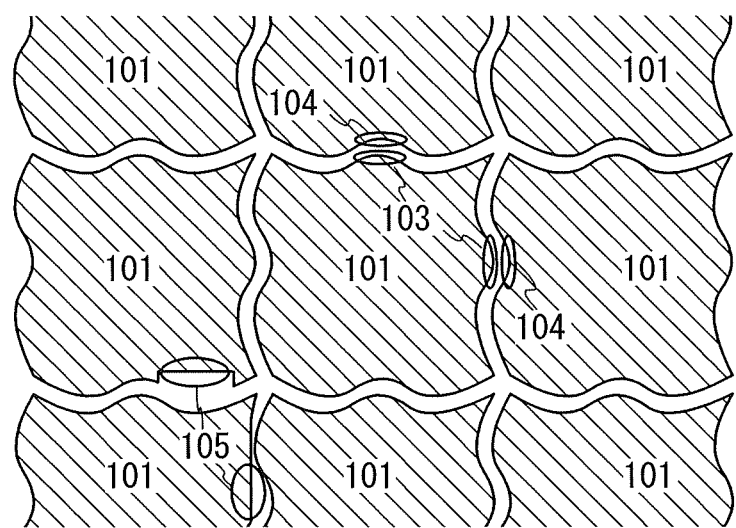
FIG. 1 illustrates an example of a display device.

Embodiments will be described in detail below with reference to the drawings. Note that the embodiments can be implemented in various different ways. It will be readily appreciated by those skilled in the art that modes and details of the embodiments can be modified in various ways without departing from the spirit and scope of the present invention. The present invention therefore should not be construed as being limited to the following description of the embodiments. In all the drawings for describing the embodiments, the same portions or portions having similar functions are denoted by the same reference numerals, and description thereof is not repeated.

Embodiment 1

In this embodiment, structure examples of a display device are described.

FIG. 1 is a top view of a pixel portion in a display device. Note that FIG. 1 illustrates part of the pixel portion.

The pixel portion includes a plurality of pixels. The plurality of pixels each include a pixel electrode 101. In one embodiment of the present invention, part of an end of the pixel electrode 101 or the entire end of the pixel electrode 101 is nonlinear. That is, the end of the pixel electrode 101 includes a portion 103 that is curved in an end-face direction. Note that the end of the pixel electrode 101 may include a linear portion 105. Further, the curved portions 103 and 104 of the adjacent two pixel electrodes 101 are preferably engaged with each other.

Here, detailed conditions of the structure of the pixel electrode 101 are described with reference to FIG. 2, FIG. 3, FIG. 4, and FIG. 5 that are magnified views of FIG. 1.

First, a first condition is described. Between two pixel electrodes that are adjacent to each other, an end of one of the pixel electrodes has a depression in the end-face direction, and an end of the other of the pixel electrodes has a projection in the end-face direction. The depression of the one of the pixel electrodes and the projection of the other of the pixel electrodes are in a set, and a gap is formed between the two pixel electrodes. Ends of the two pixel electrodes have depressions and projections, and the depression and projection of the one of the pixel electrodes and the depression and projection of the other of the pixel electrodes may be in a set.

Figure 2:
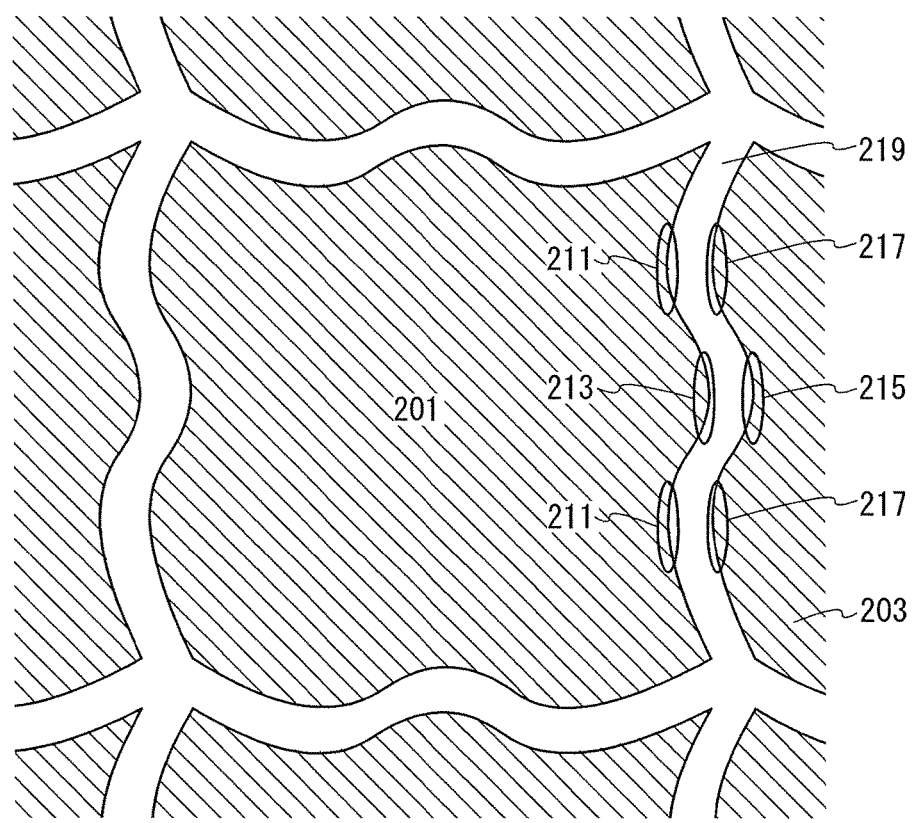
FIG. 2 illustrates an example of the display device.

FIG. 2 illustrates a specific example of the first condition. A pixel electrode 201 includes depressions 211 and a projection 213. A pixel electrode 203 includes a depression 215 and projections 217. The depression 211 of the pixel electrode 201 and the projection 217 of the pixel electrode 203 are in a set, and the projection 213 of the pixel electrode 201 and the depression 215 of the pixel electrode 203 are in a set. That is, the depressions and projection of the pixel electrode 201 and the depression and projections of the pixel electrode 203 are in sets, and a gap 219 is formed between the two pixel electrodes 201 and 203. With the first condition, the projecting portion 103 of the pixel electrode illustrated in FIG. 1 is formed.

In addition, a second condition is described. A gap is formed between two pixel electrodes that are adjacent to each other. The gap has three or more portions whose distances are equal to each other. In the three or more portions, when the middle points of the distances are connected with segments, one or more vertexes are obtained. That is, the middle points of the distances in the three or more portions are not arranged in a straight line.

Figure 3:
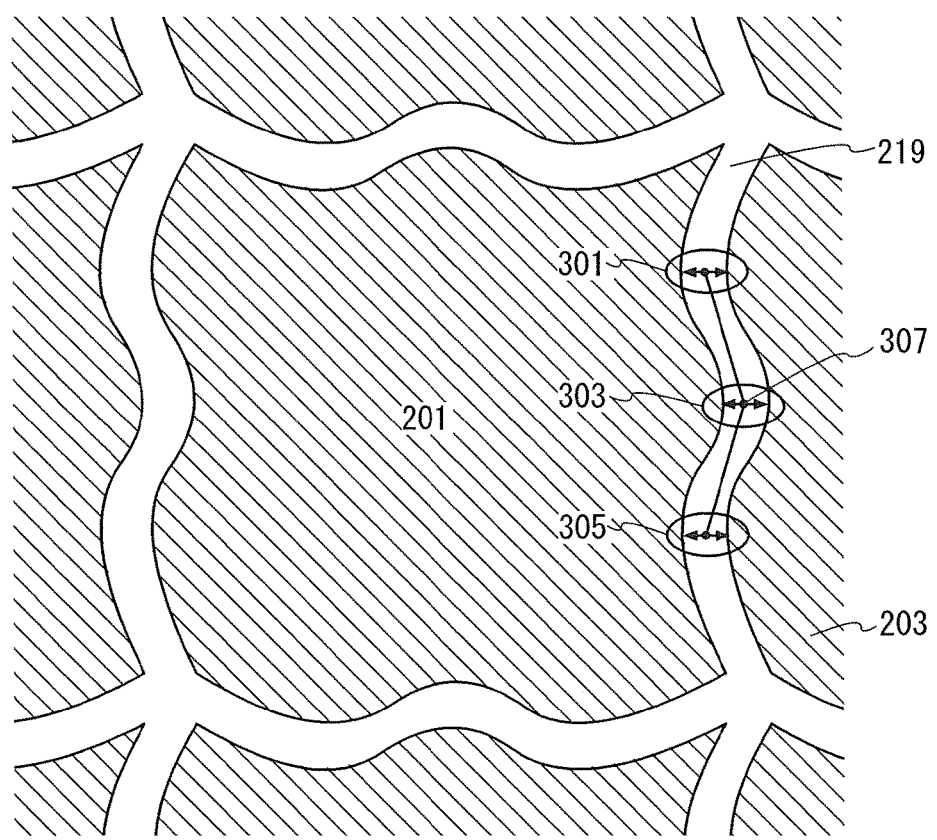
FIG. 3 illustrates an example of the display device.

FIG. 3 illustrates a specific example of the second condition. The gap 219 is formed between the two pixel electrodes 201 and 203 that are adjacent to each other. The gap 219 has three portions 301, 303, and 305 whose distances are equal to each other. In the three portions, when the middle points of the distances are connected with segments, one vertex 307 is obtained. With the second condition, the projecting portion 103 of the pixel electrode illustrated in FIG. 1 is formed.

In addition, a third condition is described. Between two pixel electrodes that are adjacent to each other, ends of the two pixel electrodes are curved and a gap is formed. The gap has three or more portions whose distances are equal to each other. In particular, the distances of the portions in half or more of one side of each of the two pixel electrodes are preferably equal to each other.

Figure 4:
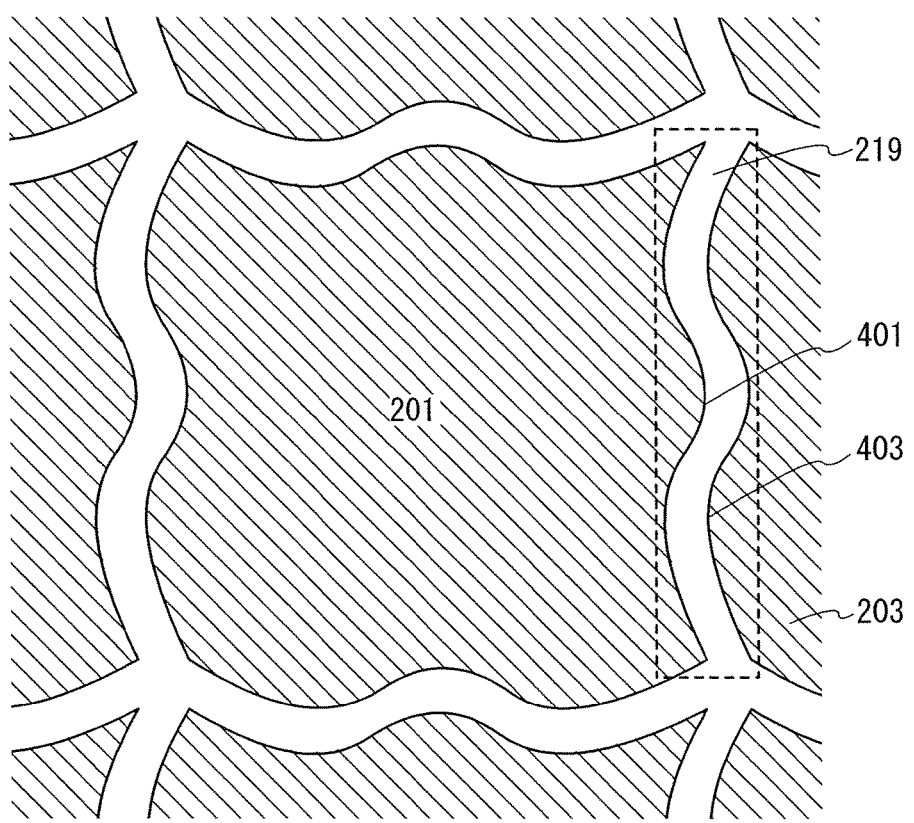
FIG. 4 illustrates an example of the display device.

FIG. 4 illustrates a specific example of the third condition. Ends 401 and 403 of the two pixel electrodes 201 and 203 are curved and the gap 219 is formed. The distance of the gap 219 is uniform in one sides of the pixel electrodes. With the third condition, the projecting portion 103 of the pixel electrode illustrated in FIG. 1 is formed.

In addition, a fourth condition is described. A right end of one pixel electrode and a left end of a pixel electrode that is adjacent to a right side of the one pixel electrode are curved and a gap is formed between the ends. An upper end of the one pixel electrode and a lower end of a pixel electrode that is adjacent to an upper side of the one pixel electrode are curved and a gap is formed between the ends. The gap in the right side of the one pixel electrode and the gap in the upper side of the one pixel electrode have two or more portions whose distances are equal to each other.

Figure 5:
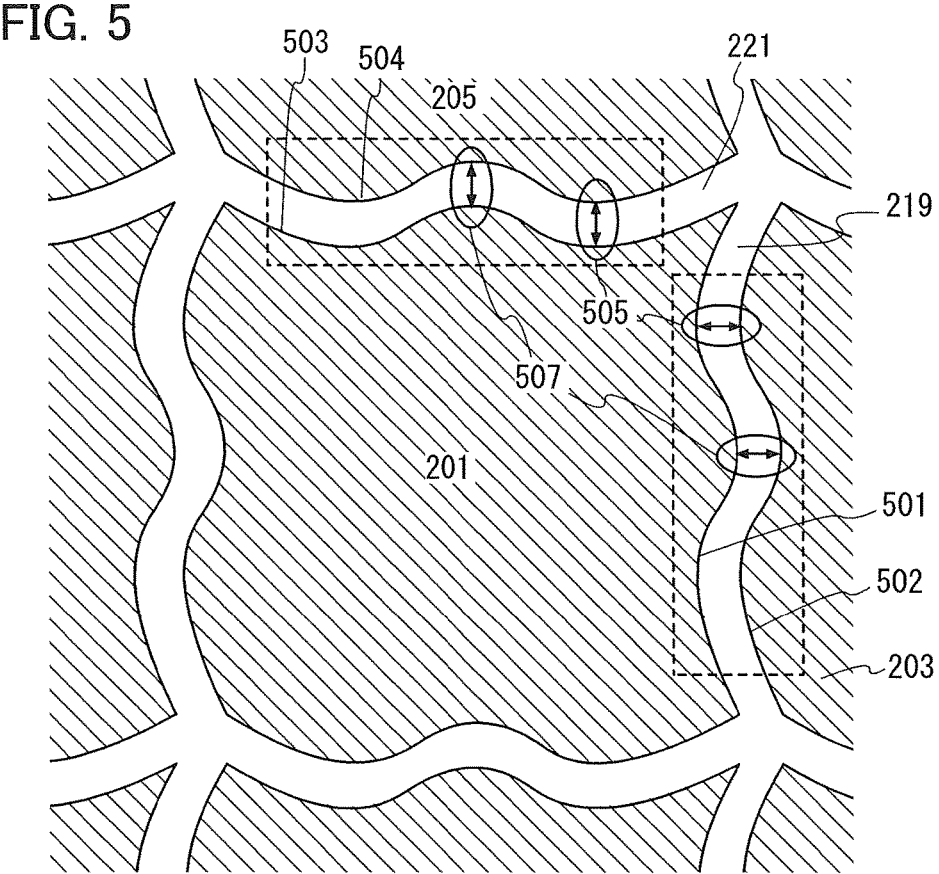
FIG. 5 illustrates an example of the display device.

FIG. 5 illustrates a specific example of the fourth condition. A right end 501 of the pixel electrode 201 and a left end 502 of the pixel electrode 203 are curved and the gap 219 is formed therebetween. An upper end 503 of the pixel electrode 201 and a lower end 504 of a pixel electrode 205 are curved and a gap 221 is formed therebetween. The gap 219 and the gap 221 have two portions 505 and 507 whose distances are equal to each other. With the fourth condition, the projecting portion 103 of the pixel electrode illustrated in FIG. 1 is formed.

Note that in the above conditions, the description "distances are equal to each other" includes the case where distances are substantially equal to each other in consideration of errors.

Advantageous effects of the structures of the pixel electrodes are described below.

Figure 6:
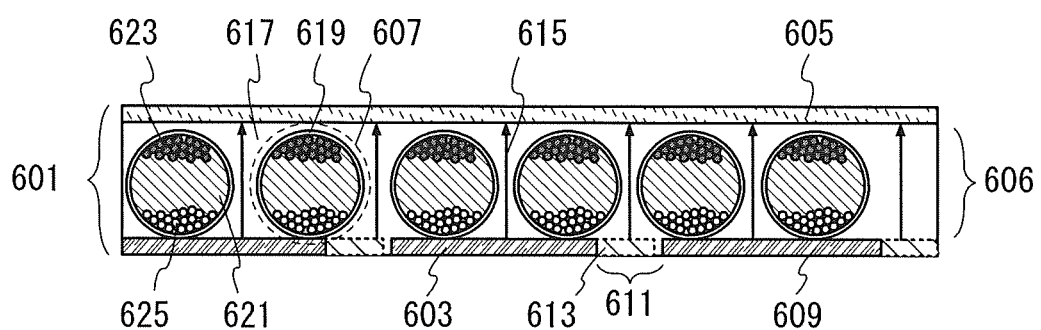
FIG. 6 illustrates an example of the display device.

FIG. 6 is a cross-sectional view of the pixel portion in FIG. 1, which illustrates three pixels. Further, FIG. 6 illustrates an example where a microcapsule electrophoretic element is used as a display element.

One pixel includes a display element 601 which includes a pixel electrode 603, a counter electrode 605, and a charged layer 606 (also referred to as a layer including a charged substance) provided between the pixel electrode 603 and the counter electrode 605. A pixel that is adjacent to the one pixel includes the display element 601 which includes a pixel electrode 609 adjacent to the pixel electrode 603, the counter electrode 605, and the charged layer 606.

The charged layer 606 includes a plurality of microcapsules 607. The microcapsule 607 includes colored particles 623 and 625. The colored particles 623 and 625 function as charged substances.

In addition, a gap 611 is formed between the pixel electrode 603 and the pixel electrode 609.

Any of the structures of the pixel electrodes that are illustrated in FIG. 1, FIG. 2, FIG. 3, FIG. 4, and FIG. 5 is used as the structures of the pixel electrodes 603 and 609. Thus, in the gap 611 in FIG. 6, the pixel electrode 603 includes a projecting portion 613 in the depth direction of paper. The projecting portion 613 corresponds to the portion 103 in FIG. 1, the projection 213 in FIG. 2, and the like.

When voltage is applied between the pixel electrodes 603 and 609 and the counter electrode 605 in this state, electric fields are generated as indicated by arrows 615.

Figure 13A:
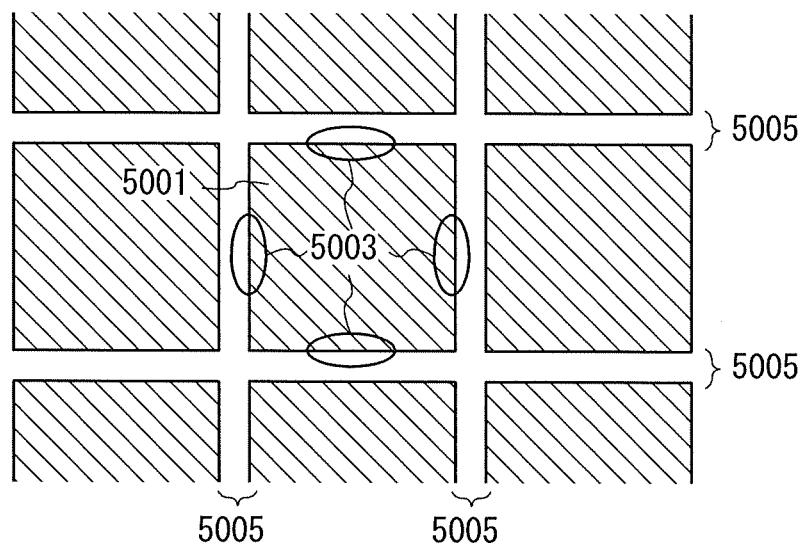
FIGS. 13A and 13B illustrate an example of a conventional display device.
Figure 13B:
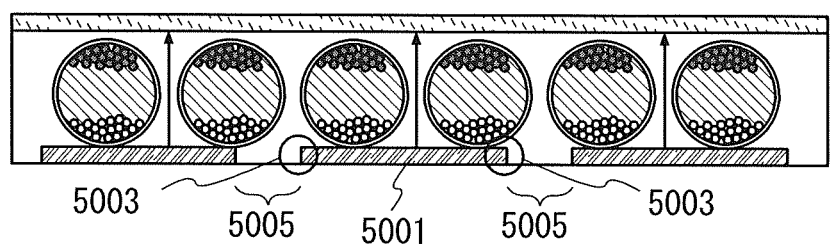

Since an electric field is also generated in the projecting portion 613 of the pixel electrode 603, an electric field can be applied to the particles 623 and 625 adequately also in part of the gap 611 or the entire gap 611. Consequently, afterimages generated in the gap 5005 in the conventional display device in FIGS. 13A and 13B can be reduced.

Note that the distance of the gap 611 is preferably smaller than a gap (also referred to as a cell gap) between the pixel electrode 603 and the counter electrode 605.

An example of the charged layer 606 is described in detail below.

The charged layer 606 includes the plurality of microcapsules 607 and a resin 617. The microcapsules 607 are dispersed in and fixed to the resin 617. The resin 617 functions as a binder.

The resin 617 preferably has light-transmitting properties. Instead of the resin 617, the charged layer 606 may be filled with a gas such as air or an inert gas. In that case, a layer or layers containing an adhesive or the like may be formed on either one or both the pixel electrode 603 and the counter electrode 605 so that the microcapsules 607 are fixed.

The microcapsule 607 includes a film 619, a liquid 621, the particle 623, and the particle 625. The liquid 621, the particle 623, and the particle 625 are encapsulated in the film 619. The film 619 has light-transmitting properties. The cross-sectional shape of the microcapsule 607 is not limited to a round shape, and may be an elliptical shape or an uneven shape.

The liquid 621 functions as a dispersion liquid. The liquid 621 can disperse the particle 623 and the particle 625 in the film 619. Note that it is preferable that the liquid 621 have light-transmitting properties and be non-tinted.

The particle 623 and the particle 625 have different colors. For example, one of the particle 623 and the particle 625 may be black and the other of the particle 623 and the particle 625 may be white. Note that the particle 623 and the particle 625 are charged so as to have different electrical charge densities, and function as charged substances. For example, one of the particle 623 and the particle 625 may be charged positively and the other of the particle 623 and the particle 625 may be charged negatively. Thus, a potential difference is generated between the pixel electrode 603 and the counter electrode 605, and the particle 623 and the particle 625 move in accordance with the direction of an electric field. Accordingly, the reflectance of the display element 601 is changed, so that gradation can be controlled.

Note that the structure of the microcapsule 607 is not limited to the above structure. For example, the liquid 621 may be colored. In addition, the colors of the particles can be selected from red, green, blue, cyan, magenta, yellow, emerald green, vermillion, or the like in addition to white and black. Further, the colors of the particles may be one kind of color or three or more kinds of colors.

Further, the mode of the display element 601 is not limited to a microcapsule type. A microcup type, a horizontal movement type, a vertical movement type, a twisting ball type (e.g., a spherical twisting ball or a cylindrical twisting ball), a powder movement type, an electronic liquid powder (registered trademark) type, a charged toner, electro wetting, electrochromism, electrodeposition, or the like can be applied to the display element 601. The display element 601 corresponds to all the elements that can be used for image display by movement of charged substances such as particles included in the charged layer 606.

Note that in the case where a display image is viewed from the counter electrode 605 side, the counter electrode 605 is formed using a light-transmitting material. As the light-transmitting material, it is possible to use, for example, indium tin oxide (ITO), indium tin oxide containing silicon oxide (ITSO), organoindium, organotin, zinc oxide (ZnO), indium zinc oxide (IZO), zinc oxide containing gallium, tin oxide ($SnO_2$), indium oxide containing tungsten oxide, indium zinc oxide containing tungsten oxide, indium oxide containing titanium oxide, or indium tin oxide containing titanium oxide.

In that case, the pixel electrode 603 can be formed using the light-transmitting material or a metal material. In particular, the pixel electrode 603 is preferably formed using a metal material whose reflectance of visible light is low or a metal material whose absorptance of visible light is high. When the pixel electrode 603 is formed using such a material, reflectance on the pixel electrode 603 does not easily occur; thus, visibility of the display image is improved. As a metal whose reflectance is low, for example, chromium or the like can be used.

Alternatively, the display image may be viewed from the pixel electrode 603 side. In that case, the pixel electrode 603 is formed using the light-transmitting material.

In that case, the counter electrode 605 is preferably formed using a metal whose reflectance is lower than the reflectance of the metal used for the pixel electrode 603. The counter electrode 605 can be formed using the metal whose reflectance is low.

Alternatively, the display image may be viewed from the counter electrode 605 side and the pixel electrode 603 side. In that case, the counter electrode 605 and the pixel electrode 603 are formed using the light-transmitting material.

In order to prevent light from shining through opposite sides, polarizing plates are preferably provided on the counter electrode 605 side and the pixel electrode 603 side in crossed nicols.

This embodiment can be combined with any of the other embodiments as appropriate.

Embodiment 2

In this embodiment, structure examples of pixel electrodes that are different from the example in FIG. 1 are described.

FIGS. 7A to 7D are top views of pixel portions in display devices. Note that FIGS. 7A to 7D illustrate some of the pixel portions.

Figure 7A:
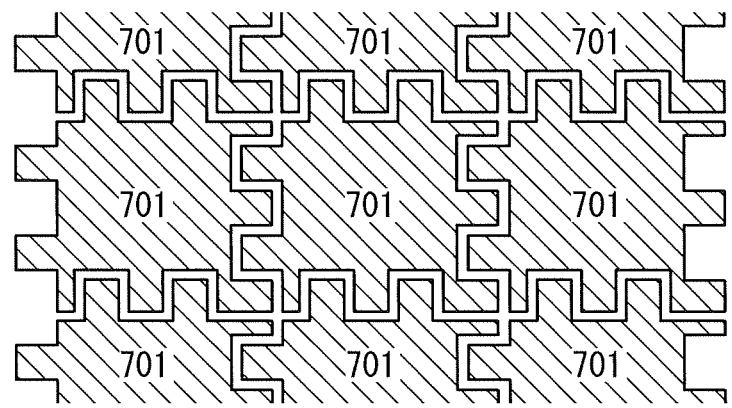
FIGS. 7A to 7D each illustrate an example of a display device.

In FIG. 7A, the pixel portion includes a pixel electrode 701. An end of the pixel electrode 701 includes a rectangular projecting portion in an end-face direction.

Figure 7B:
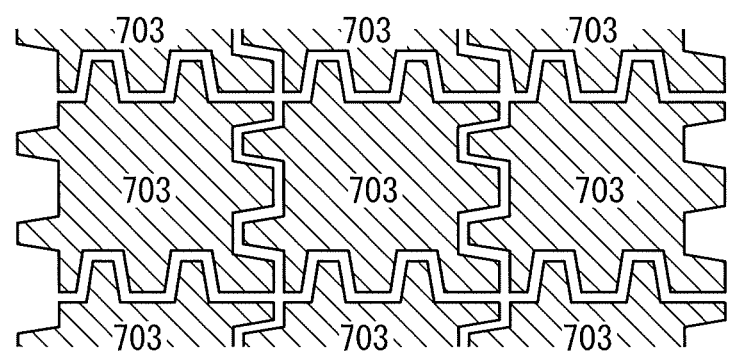

In FIG. 7B, the pixel portion includes a pixel electrode 703. An end of the pixel electrode 703 includes a trapezoidal projecting portion in an end-face direction.

Figure 7C:
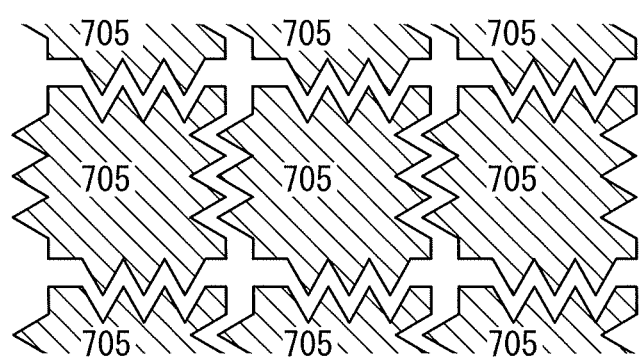

In FIG. 7C, the pixel portion includes a pixel electrode 705. An end of the pixel electrode 705 includes a triangular projecting portion in an end-face direction.

Figure 7D:
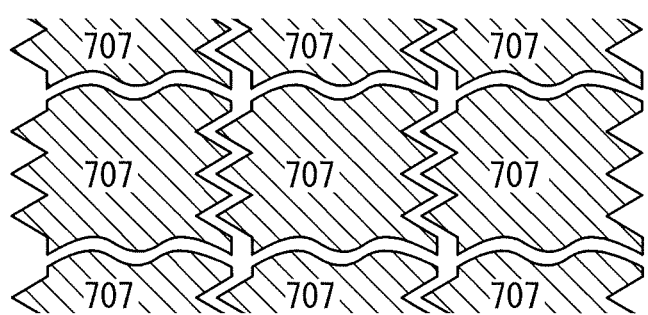

In FIG. 7D, the pixel portion includes a pixel electrode 707. A right end of the pixel electrode 707 includes a triangular projecting portion in an end-face direction. An upper end of the pixel electrode 707 includes a projecting portion in the end-face direction.

Even in the case where any of the structures in FIGS. 7A to 7D is employed, an electric field can be applied to a gap between two pixel electrodes that are adjacent to each other as in FIG. 1, FIG. 2, FIG. 3, FIG. 4, FIG. 5, and FIG. 6 when any of the first to fourth conditions described in Embodiment 1 is satisfied. Thus, afterimages in the gap can be reduced.

Further, any of the structures in FIG. 1, FIG. 7A, FIG. 7B, FIG. 7C, and FIG. 7D may be used in combination.

This embodiment can be combined with any of the other embodiments as appropriate.

Embodiment 3

In this embodiment, structure examples of display devices are described.

Figure 8A:
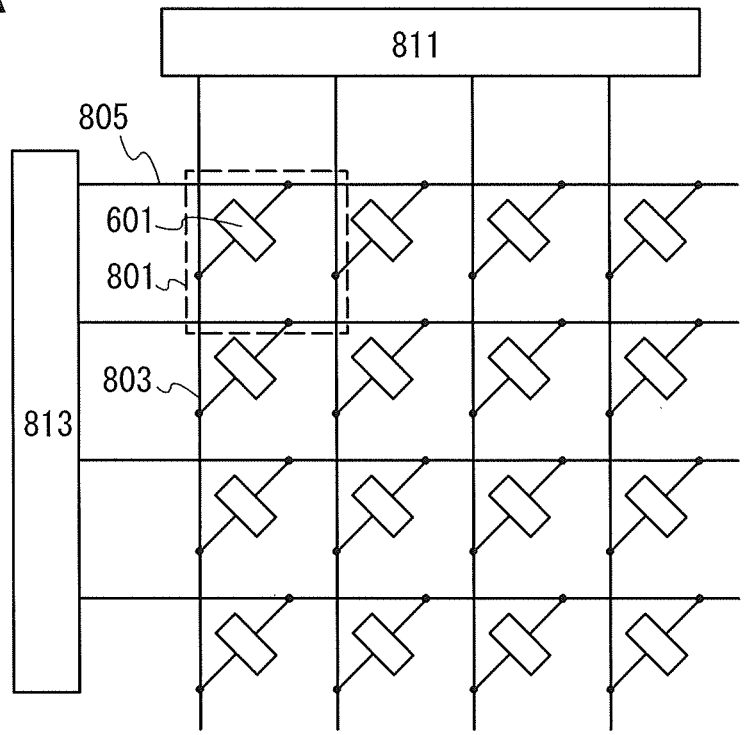
FIGS. 8A and 8B each illustrate an example of a display device.
Figure 8B:
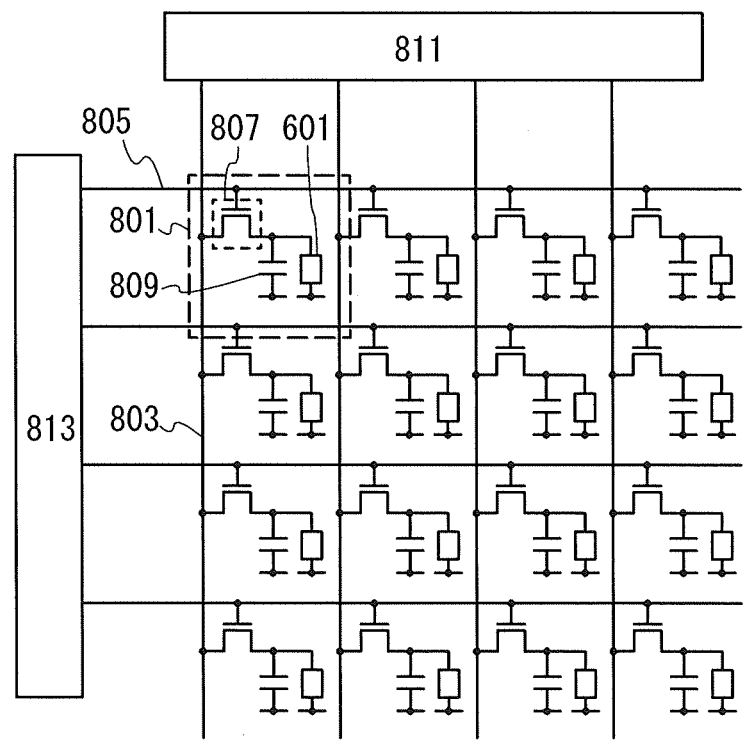

FIGS. 8A and 8B each illustrate examples of pixel circuits and driver circuits. FIG. 8A illustrates a passive-matrix display device, and FIG. 8B illustrates an active-matrix display device. Each display device includes the display elements 601 in a plurality of pixels 801 arranged in matrix.

The structure of the display element that is described in the above embodiment can be used as the structure of the display element and a driving method.

In the passive-matrix display device illustrated in FIG. 8A, the pixel 801 includes a plurality of crossed wirings 803 and 805 and the display element 601 which is electrically connected to the crossed wirings 803 and 805. In addition, the wiring 803 is electrically connected to a driver circuit 811, and the wiring 805 is electrically connected to a driver circuit 813. Further, the display element 601 expresses gradation in accordance with potentials input from the driver circuit 811 and the driver circuit 813.

In the active-matrix display device illustrated in FIG. 8B, the pixel 801 includes the plurality of crossed wirings 803 and 805, a transistor 807, the display element 601, and a capacitor 809. A gate of the transistor 807 is electrically connected to the wiring 805. One of a source and a drain of the transistor 807 is electrically connected to the wiring 803. The other of the source and the drain of the transistor 807 is electrically connected to the display element 601 and the capacitor 809. In addition, the wiring 803 is electrically connected to the driver circuit 811, and the wiring 805 is electrically connected to the driver circuit 813. On and off of the transistor 807 are controlled in accordance with a potential input from the driver circuit 813. Further, the display element 601 expresses gradation in accordance with a potential input from the driver circuit 811 at the time when the transistor 807 is on. Note that the capacitor 809 has a function of holding voltage applied to the display element 601.

Next, cross-sectional structures of pixel portions are described.

Figure 9A:
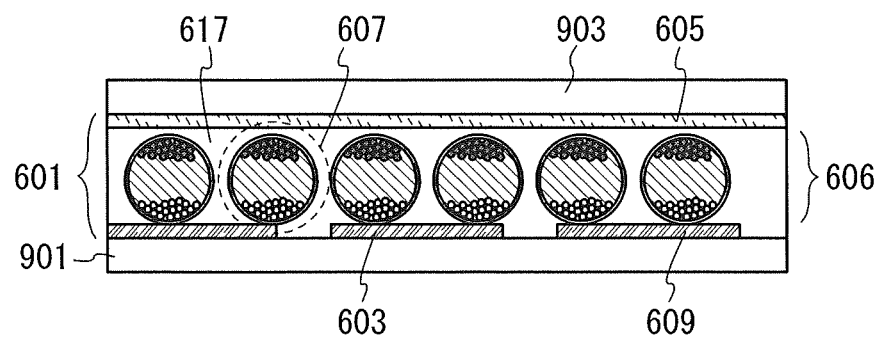
FIGS. 9A and 9B each illustrate an example of a display device.

FIG. 9A illustrates a cross-sectional structure of the passive-matrix display device. The display element 601 is provided between a substrate 901 and a counter substrate 903. The plurality of wirings 803 illustrated in FIG. 8A are the pixel electrodes 603 and 609 on the substrate 901 side extended in a direction perpendicular to paper. Thus, it is preferable that any of the first to third conditions is satisfied at ends of the plurality of wirings 803 that serve as the pixel electrodes 603 and 609. The plurality of wirings 805 illustrated in FIG. 8A are the counter electrode 605 on the counter substrate 903 side extended in a direction parallel to the paper. Note that although FIG. 9A illustrates only one counter electrode 605, the plurality of counter electrodes 605 are provided in the direction parallel to the paper. That is, the display elements 601 are formed in portions where the plurality of wirings 803 and the plurality of wirings 805 intersect with each other.

Figure 9B:
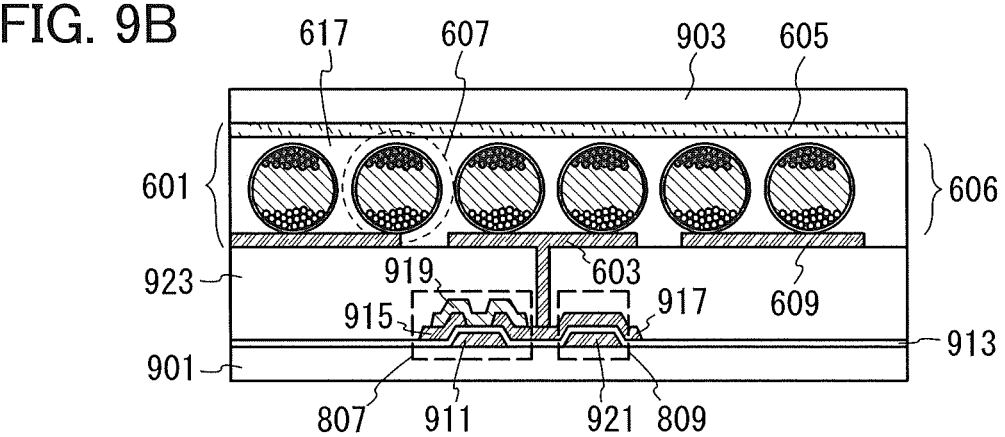

FIG. 9B illustrates a cross-sectional structure of the active-matrix display device. A layer containing the transistor 807 and the capacitor 809 and the display element 601 formed over the layer are provided between the substrate 901 and the counter substrate 903. In addition, the transistor 807 and the capacitor 809 are electrically connected to the pixel electrode 603. Note that although not illustrated in FIG. 9B, a transistor and a capacitor are electrically connected to the pixel electrode 609.

As the substrate 901 and the counter substrate 903, a glass substrate, a resin substrate, a semiconductor substrate, a metal substrate, or any of the substrates provided with an insulating film such as a nitride film or an oxide film can be used as appropriate.

The transistor 807 is a bottom-gate thin film transistor, which includes an electrode 911, an insulating film 913, an electrode 915, an electrode 917, and a semiconductor layer 919. Here, the electrode 911 is a gate electrode. In addition, the insulating film 913 is a gate insulating film. Further, one of the electrode 915 and the electrode 917 functions as a source electrode, and the other of the electrode 915 and the electrode 917 functions as a drain electrode.

The capacitor 809 includes an electrode 921, the electrode 917, and the insulating film 913. Here, the electrode 921 is a lower electrode of the capacitor 809 and a conductive layer that is formed in the same layer as the electrode 911 (the gate electrode). In addition, the insulating film 913 functions as the gate insulating film and a dielectric of the capacitor 809. Further, the electrode 917 is a conductive layer extended over the insulating film 913 and functions as one of the source electrode and the drain electrode and an upper electrode of the capacitor 809.

The electrode 911, the electrode 921, the electrode 915, and the electrode 917 are each formed to have a single-layer structure or a layered structure of a metal material such as molybdenum, titanium, tantalum, tungsten, aluminum, copper, neodymium, or scandium or an alloy material containing the metal material as a main component.

The insulating film 913 is formed as a single layer or stacked layers of a silicon oxide film, a silicon nitride film, or the like.

The semiconductor layer 919 can be formed using an amorphous semiconductor, a polycrystalline semiconductor, a single crystal semiconductor, or a microcrystalline semiconductor. In addition, as the material of the semiconductor, silicon, germanium, an organic semiconductor, an oxide semiconductor, or the like can be used. Further, either a p-channel transistor or an n-channel transistor may be used. Note that either a channel-etched transistor or a channel-stop transistor may be used, and a top-gate structure may be employed. Furthermore, a transistor using a semiconductor substrate (also referred to as a bulk transistor) may be used instead of a thin film transistor.

The transistor 807 can have a variety of structures such as a single-drain structure, an LDD (lightly doped drain) structure, and a gate-overlap drain structure.

Further, an insulating film 923 is formed between the transistor 807 and the capacitor 809, and the pixel electrode 603.

The insulating film 923 has a single-layer structure or a layered structure of an inorganic material such as silicon oxide or silicon nitride, an organic material such as polyimide, polyamide, benzocyclobutene, acrylic, or epoxy, a siloxane material, or the like.

Furthermore, a structure in which a color filter (CF) or a black matrix (BM) is provided on the substrate 901 side or the counter substrate 903 side may be employed as appropriate, for example. Note that CFs or BMs may be provided on both the substrate 901 side and the counter substrate 903 side.

This embodiment can be combined with any of the other embodiments as appropriate.

Embodiment 4

In this embodiment, examples of methods for manufacturing display devices are described. Note that the structures described in the above embodiment can be used as appropriate as materials, structures, and the like.

First, a method for manufacturing the passive-matrix display device is described with reference to FIG. 9A.

Wirings which serve as the pixel electrodes 603 and 609 are formed over the substrate 901 so as to extend in a direction perpendicular to paper. Here, a conductive film which serves as the pixel electrodes is deposited, and then, is subjected to etching or the like and is processed into the pixel electrodes 603 and 609 so that any of the first to third conditions is satisfied.

Next, the charged layer 606 (also referred to as the layer including a charged substance) is formed over the pixel electrodes 603 and 609. For example, the resin 617 where the microcapsules 607 are dispersed and fixed is provided over the pixel electrodes 603 and 609.

Then, a wiring which serves as the counter electrode 605 is formed over the resin 617 (the charged layer 606) so as to extend in a direction parallel to the paper. Note that the resin 617 over which the counter electrode 605 is formed in advance may be provided over the pixel electrodes 603 and 609.

Next, the counter substrate 903 is provided over the counter electrode 605. The counter substrate 903 is attached to the substrate 901 with a sealant.

Note that the counter substrate 903 on which the counter electrode 605 is formed may be attached to the substrate 901 with a sealant.

In the case where electronic liquid powder is used instead of the microcapsules, a polymer micro-particle which is positively charged and colored with a certain color and a polymer micro-particle which is negatively charged and colored with a different color may be provided between the pixel electrode 603 and the counter electrode 605. In this manner, the display element can be formed by the different method.

Thus, the passive-matrix display device can be manufactured.

Next, a method for manufacturing the active-matrix display device is described with reference to FIG. 9B. Description of steps that are similar to the steps in the passive-matrix display device is omitted.

The transistor 807 and the capacitor 809 are formed over the substrate 901.

The insulating film 923 is formed over the transistor 807 and the capacitor 809.

The pixel electrodes 603 and 609 are formed over the insulating film 923. Here, a conductive film which serves as the pixel electrodes is deposited, and then, is subjected to etching or the like and is processed into the pixel electrodes 603 and 609 so that any of the first to fourth conditions is satisfied.

Next, the charged layer 606 (also referred to as the layer including a charged substance) is formed over the pixel electrodes 603 and 609. For example, the resin 617 where the microcapsules 607 are dispersed and fixed is provided over the pixel electrodes 603 and 609.

Then, the counter electrode 605 is formed over the resin 617 (the charged layer 606). Note that the resin 617 over which the counter electrode 605 is formed in advance may be provided over the pixel electrodes 603 and 609.

Next, the counter substrate 903 is provided over the counter electrode 605. The counter substrate 903 is attached to the substrate 901 with a sealant.

Note that the counter substrate 903 on which the counter electrode 605 is formed may be attached to the substrate 901 with a sealant.

Thus, the active-matrix display device can be manufactured.

This embodiment can be combined with any of the other embodiments as appropriate.

Embodiment 5

In this embodiment, an example of a method for manufacturing a display device that is different from the example in Embodiment 4 is described. Note that the structures described in the above embodiment can be used as appropriate as materials, structures, and the like.

Figure 10A:
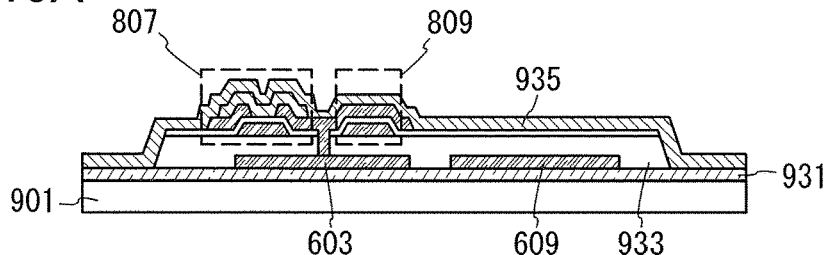
FIGS. 10A to 10E illustrate an example of a display device.

First, a separation layer 931 is formed over the substrate 901 (see FIG. 10A).

The separation layer 931 can be formed to have a single-layer structure or a layered structure of a material such as tungsten, molybdenum, titanium, tantalum, niobium, nickel, cobalt, zirconium, zinc, ruthenium, rhodium, palladium, osmium, iridium, or silicon. Alternatively, the separation layer 931 may be formed using an alloy material containing such an element as a main component, or a compound material containing such an element as a main component. The separation layer 931 can be formed to a thickness of 30 to 200 nm with the use of such a material by sputtering, plasma-enhanced CVD, coating, printing, or the like.

In addition, an insulating film (e.g., a silicon nitride film or a silicon oxide film) which serves as a buffer layer may be formed over the separation layer 931. Provision of the insulating film facilitates separation along a surface of the separation layer 931 in a later separation step.

Next, the pixel electrodes 603 and 609 are formed over the separation layer 931. Here, a conductive film which serves as the pixel electrodes is deposited, and then, is subjected to etching or the like and is processed into the pixel electrodes 603 and 609 so that any of the first to fourth conditions is satisfied.

An insulating film 933 is formed over the pixel electrodes 603 and 609. The insulating film 933 has a single-layer structure or a layered structure of an inorganic material such as silicon oxide or silicon nitride, an organic material such as polyimide, polyamide, benzocyclobutene, acrylic, or epoxy, a siloxane material, or the like. The insulating film 933 can be formed using such a material by CVD, sputtering, an SOG method, a droplet discharge method, screen printing, or the like.

Then, the transistor 807 and the capacitor 809 are formed over the insulating film 933. In addition, the transistor 807 and the capacitor 809 are electrically connected to the pixel electrode 603. Note that a transistor and a capacitor which are electrically connected to the pixel electrode 609 are not illustrated in FIG. 10A.

After that, parts of the insulating film 933 that are provided at ends of the substrate 901 are removed by etching or the like. Then, an insulating film 935 is formed so as to cover the transistor 807 and the capacitor 809. The insulating film 935 functions as a barrier layer and can be formed using a nitrogen-containing layer (a layer containing silicon nitride, silicon nitride oxide, silicon oxynitride, or the like).

Figure 10B:
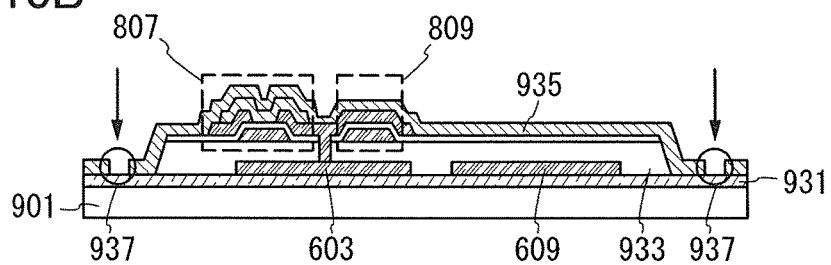
Figure 10C:
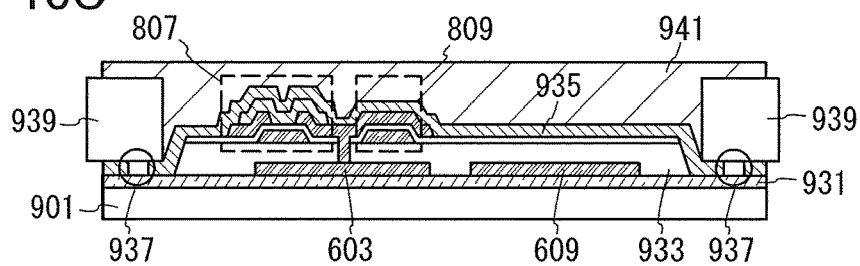

Next, grooves 937 are formed by irradiation of the insulating film 935 with laser beams (see FIG. 10B). Then, a separate film 939 is provided so as to cover at least the grooves 937 (see FIG. 10C).

After that, a first organic resin 941 is formed over the insulating film 935. Provision of the separate film 939 can prevent the first organic resin 941 from entering the grooves 937 and being bonded to the separation layer 931. Note that the organic resin 941 functions as a substrate (also referred to as a support substrate).

Figure 10D:
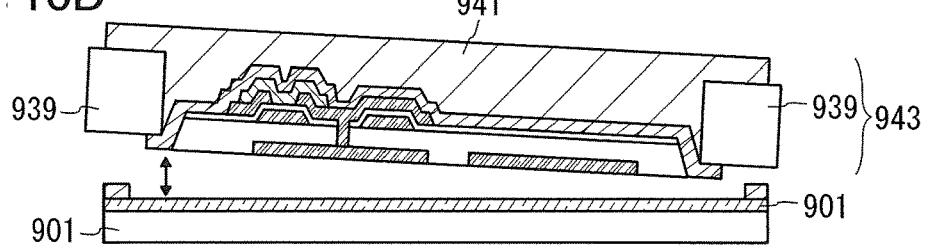

Then, an element layer 943 is separated from the substrate 901 along the surface of the separation layer 931 from the grooves 937 (see FIG. 10D). The separate film 939 is eliminated after the separation.

Figure 10E:
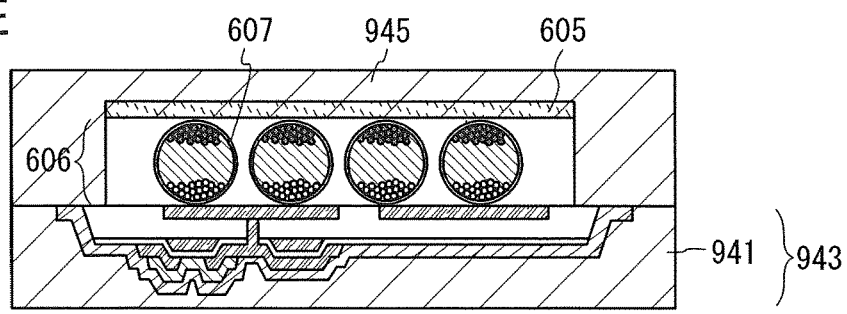

Next, as described in another embodiment, the charged layer 606 (the layer including a charged substance) is formed over the pixel electrodes 603 and 609 (see FIG. 10E). Note that the separated element layer 943 is used while being upside down.

Then, a second organic resin 945 on which the counter electrode 605 is formed is provided over the charged layer 606. After that, the first organic resin 941 and the second organic resin 945 are bonded to each other by heat treatment. The second organic resin 945 functions as a counter substrate.

Note that the formation order of the charged layer 606, the counter electrode 605, and the counter substrate may be similar to the formation order in the above embodiment.

A thermosetting resin such as an epoxy resin, an unsaturated polyester resin, a polyimide resin, a bismaleimide-triazine resin, or a cyanate resin can be used as the first organic resin 941 and the second organic resin 945. Alternatively, a thermoplastic resin such as a polyphenylene oxide resin, a polyetherimide resin, or a fluorine resin may be used. A flexible display device can be manufactured using an organic resin.

Note that a passive-matrix display device can be manufactured by applying the manufacturing method.

This embodiment can be combined with any of the other embodiments as appropriate.

Embodiment 6

In this embodiment, the positional relation between a pixel electrode and different wirings is described.

Figure 11:
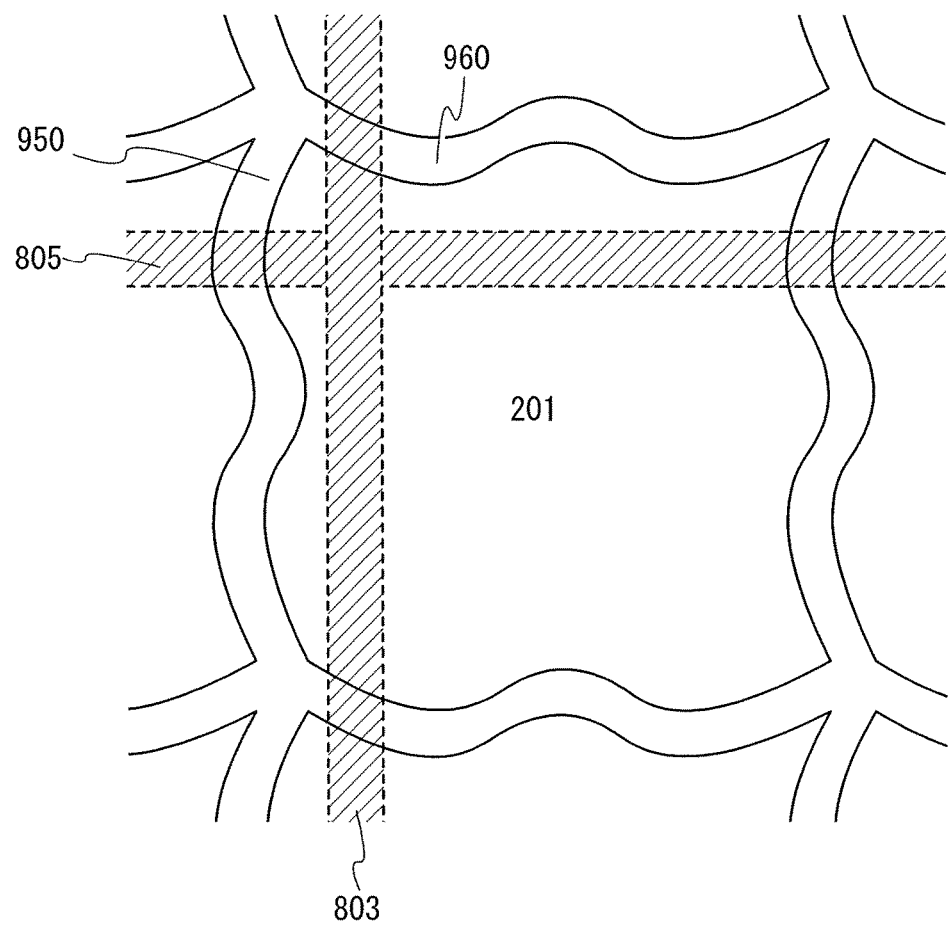
FIG. 11 illustrates an example of the display device.

FIG. 11 illustrates an example of the positional relation between the pixel electrode illustrated in FIG. 1, FIG. 2, FIG. 3, FIG. 4, FIG. 5, or FIG. 6 and the wirings 803 and 805 illustrated in FIG. 8B.

In FIG. 11, the pixel electrode 201 and the wirings 803 and 805 overlap with each other. That is, the wiring 803 does not overlap with a gap 950 and the wiring 805 does not overlap with a gap 960.

With this positional relation, in the gap 950, an electric field generated by the potential of the wiring 803 can be prevented from being applied to a charged substance. Thus, afterimages can be reduced in the gap 950.

Similarly, in the gap 960, an electric field generated by the potential of the wiring 805 can be prevented from being applied to a charged substance. Thus, afterimages can be reduced in the gap 960.

This embodiment can be combined with any of the other embodiments as appropriate.

Embodiment 7

In this embodiment, examples of electronic devices are described.

Figure 12A:
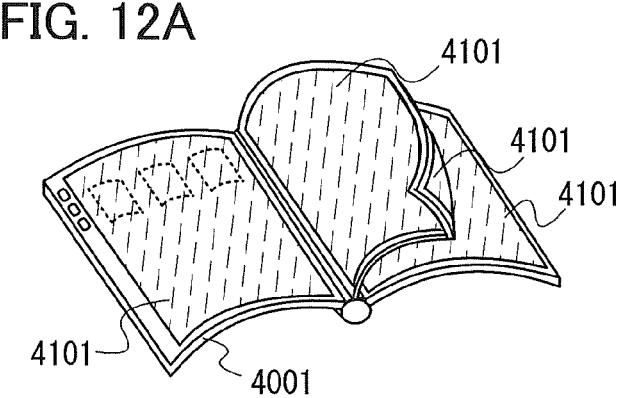
FIGS. 12A to 12F each illustrate an example of an electronic device.
Figure 12D:
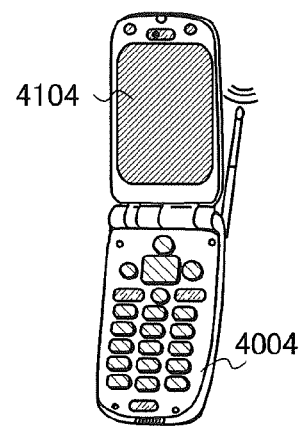
Figure 12B:
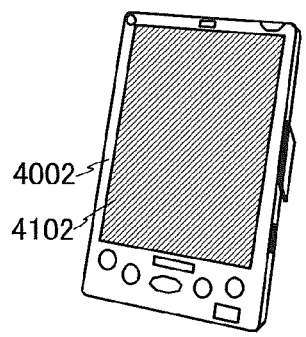

FIGS. 12A and 12B each illustrate electronic paper (also referred to as an e-book reader, an electronic book, or the like). In FIGS. 12A and 12B, the display device disclosed in this specification can be used in a display portion 4101 in a main body 4001 and a display portion 4102 in a main body 4002.

Figure 12E:
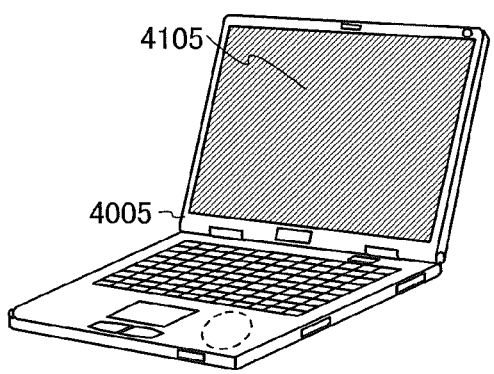
Figure 12C:
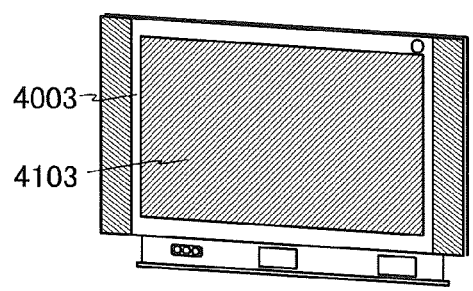
Figure 12F:
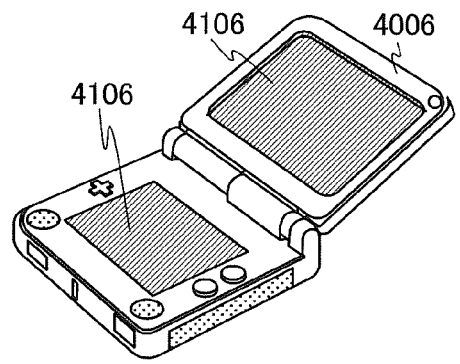

Further, without limitation to the electronic paper, the display device disclosed in this specification can be used in display portions 4103 to 4106 in main bodies 4003 to 4006 in electronic devices such as a television in FIG. 12C, a cellular phone in FIG. 12D, a personal computer in FIG. 12E, and a game machine in FIG. 12F.

This embodiment can be combined with any of the other embodiments as appropriate.

This application is based on Japanese Patent Application serial No. 2010-144911 filed with Japan Patent Office on Jun. 25, 2010, the entire contents of which are hereby incorporated by reference.

What is claimed is:
1. A display device comprising:
a first substrate;
a plurality of pixel electrodes over the first substrate, wherein: each of the plurality of pixel electrodes has a first end, a second end being adjacent to the first end, a third end being opposite to the first end, and a fourth end being opposite to the second end;
a layer including a charged substance over the plurality of pixel electrodes; and
a counter electrode over the layer including the charged substance; and
a second substrate over the counter electrode, wherein among the plurality of pixel electrodes, first, second, and third pixel electrodes are arranged successively on one line, wherein the first end of each of the first, second, and third pixel electrodes has a first part having a projection and a second part adjacent to the first part, wherein the third end of each of the first, second, and third pixel electrodes has a third part having a depression and a fourth part adjacent to the third part, and wherein the depression of the third end of the first pixel electrode and the projection of the first end of the second pixel electrode face each other with a first gap, and the depression of the third end of the second pixel electrode and the projection the first end of the third pixel electrode face each other with a second gap.

2. The display device according to claim 1,
wherein the fourth part of the third end of the first pixel electrode and the second part of the first end of the second pixel electrode face each other with the first gap, and
wherein the fourth part of the third end of the second pixel electrode and the second part the first end of the third pixel electrode face each other with the second gap.

3. The display device according to claim 1,
wherein the second part of the first end of each of the first, second, and third pixel electrodes has a depression, and
wherein the fourth part of the third end of each of the first, second, and third pixel electrodes has a projection.

4. The display device according to claim 1,
wherein the second end of the second pixel electrode faces a fourth end of a fourth pixel electrode with a third gap, and
wherein the fourth end of the second pixel electrode faces a second end of a fifth pixel electrode with a fourth gap.

5. The display device according to claim 1,
wherein the second end of at least one of the first, second, and third pixel electrodes has a projection, and
wherein the fourth end of at least the first, second, and third pixel electrodes has a depression.

6. The display device according to claim 1, wherein each distance of the first gap and the second gap is smaller than a distance between the second pixel electrode and the counter electrode.

7. The display device according to claim 1, further comprising:
a transistor over the first substrate, the transistor including a gate electrode comprising a first material, a gate insulating layer over the gate electrode, a semiconductor layer over the gate insulating layer, and source and drain electrodes comprising a second material, wherein one of the source and drain electrodes is electrically connected to the second pixel electrode; and
a capacitor over the first substrate, the capacitor including a first electrode comprising the first material and a second electrode comprising the second material.

8. The display device according to claim 1, wherein the layer including the charged substance includes a plurality of microcapsules.

9. The display device according to claim 1, wherein the first, second, and third pixel electrodes are arranged successively in a column direction.

10. The display device according to claim 1, wherein the first, second, and third pixel electrodes are arranged successively in a row direction.

11. The display device according to claim 1, wherein the first substrate comprises resin.

12. The display device according to claim 1, wherein the display device is flexible.

13. The display device according to claim 1, wherein the display device is a passive matrix display device.

14. The display device according to claim 1, wherein the display device is an active matrix display device.

15. A display device comprising:
a first substrate;
a plurality of pixel electrodes over the first substrate, wherein: each of the plurality of pixel electrodes has a first end, a second end being adjacent to the first end, a third end being opposite to the first end, and a fourth end being opposite to the second end;
a layer including a charged substance over the plurality of pixel electrodes; and
a counter electrode over the layer including the charged substance; and
a second substrate over the counter electrode,
wherein among the plurality of pixel electrodes, first, second, and third pixel electrodes are arranged successively on one line,
wherein the first end of each of the first, second, and third pixel electrodes has a first part having a projection and a second part adjacent to the first part,
wherein the third end of each of the first, second, and third pixel electrodes has a third part having a depression and a fourth part adjacent to the third part, and
wherein the third part of the third end of the first pixel electrode and the first part of the first end of the second pixel electrode face each other with a first gap, and the third part of the third end of the second pixel electrode and the first part of the first end of the third pixel electrode face each other with a second gap.

16. The display device according to claim 15,
wherein the fourth part of the third end of the first pixel electrode and the second part of the first end of the second pixel electrode face each other with the first gap, and
wherein the fourth part of the third end of the second pixel electrode and the second part the first end of the third pixel electrode face each other with the second gap.

17. The display device according to claim 15,
wherein the second part of the first end of each of the first, second, and third pixel electrodes has a depression, and
wherein the fourth part of the third end of each of the first, second, and third pixel electrodes has a projection.

18. The display device according to claim 15,
wherein the second end of the second pixel electrode faces a fourth end of a fourth pixel electrode with a third gap, and
wherein the fourth end of the second pixel electrode faces a second end of a fifth pixel electrode with a fourth gap.

19. The display device according to claim 15,
wherein the second end of at least one of the first, second, and third pixel electrodes has a projection, and
wherein the fourth end of at least the first, second, and third pixel electrodes has a depression.

20. The display device according to claim 15, wherein each distance of the first gap and the second gap is smaller than a distance between the second pixel electrode and the counter electrode.

21. The display device according to claim 15, further comprising:
a transistor over the first substrate, the transistor including a gate electrode comprising a first material, a gate insulating layer over the gate electrode, a semiconductor layer over the gate insulating layer, and source and drain electrodes comprising a second material, wherein one of the source and drain electrodes is electrically connected to the second pixel electrode; and a capacitor over the first substrate, the capacitor including a first electrode comprising the first material and a second electrode comprising the second material.

22. The display device according to claim 15, wherein the layer including the charged substance includes a plurality of microcapsules.

23. The display device according to claim 15, wherein the first, second, and third pixel electrodes are arranged successively in a column direction.

24. The display device according to claim 15, wherein the first, second, and third pixel electrodes are arranged successively in a row direction.

25. The display device according to claim 15, wherein the first substrate comprises resin.

26. The display device according to claim 15, wherein the display device is flexible.

27. The display device according to claim 15, wherein the display device is a passive matrix display device.

28. The display device according to claim 15, wherein the display device is an active matrix display device.

* * * * *